United States Patent Office 3,097,088
Patented July 9, 1963

3,097,088
OIL-SOLUBLE PLANT GROWTH REGULATION AGENTS
Richard A. Reck, Hinsdale, Walter W. Abramitis, Downers Grove, and Charles S. Wilhelmy, Chicago, Ill.; said Reck assignor, by mesne assignments, to Armour and Company, a corporation of Delaware
No Drawing. Filed June 15, 1959, Ser. No. 820,081
9 Claims. (Cl. 71—2.5)

Our invention relates to plant response agents and more particularly to oil-soluble, 3,6-endoxohydrophthalic acid-amine salts.

Salts containing a 3,6-endoxohydrophthalic acid radical have been utilized in plant growth regulation previously. The maximum utilization of these salts has been hampered by two phenomena. First, the water and oil solubility of the hydrocarbon-containing salts decrease as the number of carbon atoms in the hydrocarbon chain increases. Secondly, aqueous salt solutions are relatively ineffective as plant growth regulators when applied to plants in arid regions and in regions where there is excessive rainfall. It appears that the presence of a solvent is necessary if the hexahydrophthalic acid salt is to pass into the plant. In arid regions, the water evaporates before effective amounts of the salt can pass into the plant and, as a result, the salts are ineffective. In regions of excessive rainfall, the salts wash off the plant and leach from the top soil at a rate such that the use of these salts is economically impossible.

We have now discovered oil-soluble amine salts containing 3,6-endoxohydrophthalic acid radicals, which expand considerably the armamentarium of the entomologist. These oil-soluble salts are formed when 3,6-endoxohydrophthalic acids or anhydrides are reacted with primary amines having the primary amine substituent attached to a secondary or tertiary carbon atom. Preferably, these amines contain from about 8 to about 18 carbon atoms in at least one of the organic radicals attached to the amine substituted carbon atom and optimally from about 8 to about 14 carbon atoms. I prefer to use aliphatic amines having the primary amine substituent attached to a secondary carbon atom.

Amines utilized in preparing the 3,6-endoxohydrophathalic acid salts of our invention include 2-tridecylamine, 2-nonyldecylamine, 7-pentadecylamine, 10-nonyldecylamine, 12-tricosylamine, 18-pentatriacontylamine, 2-tridecenylamine, 12-tricosenylamine, 2-amino-2-methylnonane, 2-amino-2-propyloctadecane, 4-amino-4-nonyldocosane, 1-phenyl-1-octylamine, 2-amino-2-(p-aminophenyl)decane, 4-amino-1-(m-chlorophenyl)pentadecene, 1-chloro-3-aminoheneicosane, 1-(2,4,6-trichlorophenyl)-2-aminoundecane, 1-amino-1-(β-naphthyl)decane, 1-aceto-3-aminohexadecane and 2-(p-nitrophenyl)-3-amino-3-methylnonane.

All of the 3,6-endoxohydrophthalic acids and their anhydrides are useful in formulating the amine salts of our invention. Thus, the di, tetra and hexahydrophthalic acids or their monovalent radical substituted analogs are useful in preparing oil-soluble amine salts. Radicals which can be substituted for the hydrogens on the hydrophthalic molecule include halogens, for instance chlorine and bromine; alkyl radicals, acyl radicals, alkoxy radicals, aryloxy, acyloxyalkyl and nitro radicals. We prefer to use the unsubstituted hydrophthalic acids and particularly prefer to use the hexahydrophthalic acid and anhydride in forming our desired amine salts.

Good yields of the oil-soluble amine salts are obtained by contacting a desired amine with an equivalent amount of a desired 3,6-endoxohydrophthalic acid or anhydride at temperatures of about 50 to about 80° C. Both lower and higher temperatures are operable and none of the reaction conditions are critical in any way.

Suitable oils for herbicidal use include both toxic and non-toxic oils. These oils can be derived from crude petroleum or from animal or vegetable sources. Such oils include tall oils, kerosene, light and heavy lubricating oils and benzine. Where the solution is to be used for defoliation or rooting purposes, it is preferable to use a non-toxic oil which is relatively harmless to the plant. We prefer to use relatively non-volatile oils, particularly petroleum fractions, to obtain maximum benefit from the growth regulatory amine salts.

The oil solutions are applied to the plants by spraying or painting and the plant can even be dipped in the solution. We prefer spray application when large areas are to be treated.

The amount of 3,6-endoxohydrophthalic acid-amine salt in solution to be applied to a particular plant varies with the species of the plant and with the desired result. For example, good leaf abscission is obtained in young bean plants when the plants are sprayed with a 0.1% salt solution and leaf abscission is obtained in young American Holly bushes with a 1% spray. On the other hand, an oil solution containing 25%, or more, of the desired amine salt is needed to kill trees when introduced into the tree through bore holes in the roots or trunk.

The following examples more fully illustrate our invention but it is not intended that the scope of our invention be limited by the amines used, the reaction conditions, or endoxohydrophthalic acids utilized. Rather it is intended that all equivalents obvious to those skilled in the art be included within the scope of our invention as claimed.

*Example I*

To prepare the 10-aminononyldecane salt of 3,6-endoxohexahydrophthalic acid, 28.3 grams of 10-aminononyldecane was added to 9.6 grams of finely ground 96% 3,6-endoxohydrophthalic acid. The mixture was warmed on a steam bath to about 70–75° C. with stirring until a homogeneous reaction mixture was formed. The resulting colorless liquid salt had a neutralization equivalent of 398 (theory 376) and was 94.4% pure.

*Example II*

The following table discloses the solubility of three long chain aliphatic n-primary amines in water and n-hexane (Skellysolve B), together with the solubility of three long chain salts wherein the primary amine is attached to a secondary carbon atom.

| 3,6-endoxohexahydro-phthalic salt, Amine Radical | Temp., °C. | Solubility, g./100 mls. of solvent | |
|---|---|---|---|
| | | Water | n-hexane |
| n-hexyl | 26 | Miscible in all proportions. | 0.079. |
| n-dodecyl | 26 | 0.045 | 0.150. |
| n-octadecyl | 27 | 0.003 | 0.135. |
| 8-pentadecyl | 30 | 0.044 | Miscible in all portions. |
| 10-nonyldecyl | 30 | 0.021 (0.032) | Do. |
| 12-tricosyl | 30 | 0.036 | Do. |

*Example III*

Using a fog nozzle, 2 pounds of a 10% solution of the salt obtained from 3,6-endoxohexahydrophthalic acid and pentadecylamine dissolved in petroleum ether are sprayed on a field of weeds common to northern Illinois. Within a few days pronounced burning is apparent and with the passage of a week or two almost total weed destruction is noted.

Example IV

To defoliate privit, *Ligustrum vulgare*, a 3% solution of the 2-tridecylamine salt of 3,6-endoxohexahydrophthalic acid in 5 SAE motor oil is sprayed on the plant. Within a few days abscission of the leaves begins and continues until the plant is almost stripped. Some burning is noted.

Example V

A solution suitable for killing most trees can be prepared by dissolving 25 parts by weight of the 12-tricosylamine salt of 3,6-endoxotetrahydrophthalic acid in 75 parts corn oil.

Now having described our invention, what we claim is:

1. Plant growth regulatory compositions comprising solutions having an effective concentration of primary amine salts of 3,6-endoxohexahydrophthalic acid in oil, said primary amine salts having the primary amine radical attached to a carbon atom selected from the group consisting of secondary and tertiary carbon atoms and wherein at least one of the organic radicals attached to the amine substituted carbon atom contains from about 8 to about 18 carbon atoms.

2. In a method of regulating plant growth, the improvement comprising contacting a plant with a solution of a primary amine salt of 3,6-endoxohexahydrophthalic acid in oil, said primary amine having the amine radical attached to a carbon atom selected from the group consisting of secondary and tertiary carbon atoms and said solution applied at a rate sufficient to promote plant growth regulating effect and wherein the amine contains at least one organic radical having from about 8 to about 18 carbon atoms attached to the amine substituted carbon atom.

3. Oil soluble primary amine salts of a compound selected from the group consisting of 3,6-endoxohydrophthalic acids and 3,6-endoxohydrophthalic anhydrides, said primary amine having the primary amine radical attached to a carbon atom selected from the group consisting of secondary and tertiary carbon atoms and wherein at least one of the organic radicals attached to the amine substituted carbon atom contains from about 8 to 18 carbon atoms.

4. Oil soluble primary salts of 3,6-endoxohexahydrophthalic acid, said primary amine having the amine radical attached to a carbon atom selected from the group consisting of secondary and tertiary carbon atoms and wherein at least one of the organic radicals attached to the amine substituted carbon atom contains from about 8 to 18 carbon atoms.

5. The 2-tridecylamine salt of 3,6-endoxohexahydrophthalic acid.

6. The 2-nonyldecylamine salt of 3,6-endoxohexahydrophthalic acid.

7. The 8-pentadecylamine salt of 3,6-endoxohexahydrophthalic acid.

8. The 10-nonyldecylamine salt of 3,6-endoxohexahydrophthalic acid.

9. The 12-tricosylamine salt of 3,6-endoxohexahydrophthalic acid.

References Cited in the file of this patent

UNITED STATES PATENTS

| | | |
|---|---|---|
| 2,550,494 | Olin | Apr. 24, 1951 |
| 2,576,081 | Tischler et al. | Nov. 20, 1951 |
| 2,609,286 | Tischler | Sept. 2, 1952 |
| 2,637,642 | Tischler | May 5, 1953 |
| 2,900,411 | Harwood et al. | Aug. 18, 1959 |